Jan. 8, 1952     H. L. FORGAARD     2,581,641

NUT

Filed March 18, 1947

INVENTOR.

Harcourt Lesbie Forgaard.

BY Toulmin & Toulmin

ATTORNEY.

Patented Jan. 8, 1952

2,581,641

UNITED STATES PATENT OFFICE 2,581,641

NUT

Harcourt Lester Forgaard, Wordsley, near Stourbridge, England

Application March 18, 1947, Serial No. 735,307
In Great Britain January 29, 1946

Section 1, Public Law 690, August 8, 1946
Patent expires January 29, 1966

4 Claims. (Cl. 151—21)

This invention relates to nuts, and has for its object to provide an improved construction.

According to the present invention I provide a nut comprising one or more elements or portions of dished or conical form having a central threaded hole for screwing onto a threaded stem, the element or elements or portions being mounted in a pressure ring or body and locked against rotation therein, but being capable of moving towards a flattened position so as to contract the diameter of the threaded hole when the element is screwed down against the work.

Also according to the present invention I provide a nut comprising a laminated element of dished or conical superposed plates or portions having a central threaded hole for screwing onto a threaded stem, the plates or portions being connected together at one or more positions but being capable of moving towards a flattened position so as to contract the diameter of the threaded hole when the element is screwed down against the work.

Preferably, the element formed by the superposed plates is mounted in a pressure ring or body which may be of hexagonal, square, elongated flat strip, or any other shape upon its exterior, but instead of using a pressure ring or body the plates forming the element may be welded or otherwise secured together at the periphery, or elsewhere, so that the pressure ring or body can be dispensed with.

It is however preferred to mount the element in a pressure ring forming the body of the nut, and the element, or the plates forming the element, may be locked thereto by inserting the element in a recess in the body and applying a preliminary endwise pressure so as to force the periphery of the laminated element into binding contact with the inner wall of the recess in the body, and this may be done prior to the drilling and tapping of the element.

Either or both the inner wall of the body and the peripheral edges of the plates forming the laminated element may be serrated either axially or circumferentially, or otherwise, in order to cause the element to become locked within the body after such preliminary endwise pressure has been applied.

Also, according to the present invention, the nut may be made as an anchor nut or a floating anchor nut by providing an anchor plate attached to the body of the nut by means of a tubular projection on one side of the plate which enters a hole at one end of the body of the nut and has its end expanded to engage a shoulder within the body of the nut. In such an arrangement the diameter of the hole in the end of the nut body may be somewhat larger than the diameter of the neck of the tubular projection on the plate, so that the nut is allowed a floating movement at right angles to its axis in any direction on the plate.

Laminated elements in accordance with the present invention without pressure rings or bodies may be inserted in recesses or openings in any machine part and locked thereto at the periphery by applying axial pressure to the element, and drilled and tapped.

In order to increase the resilience of the elements in an axial direction, one or more hardened and tempered spring cones or dished plates may be incorporated therein, said plate or plates having a clearance hole so that it or they do not engage the screwthread.

A single pressure ring or body may incorporate one or more of the conical or dished plates or an element, and also an internally-threaded sleeve of similar outside form arranged coaxially therewith, and in such a construction the plate or element is disposed between the sleeve and the end of the pressure ring or body which is to engage the work. Further, the plate or element may be of the same material as the sleeve, or of a different material. For instance, the sleeve may be made of a metal and adapted to withstand the tension of the screw, while the plate or element may be made of softer material, such for instance as lead, and used for sealing only.

The invention is illustrated in the accompanying drawings, wherein:

Figure 6 is a sectional view in side elevation showing another modification;

Figure 1:
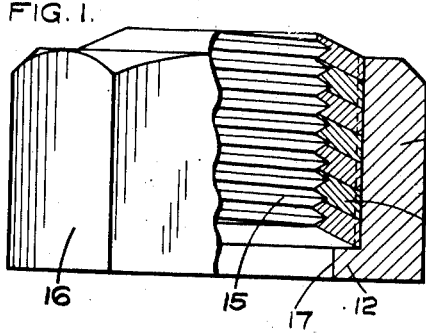
Figure 1 is a sectional view in side elevation.

In the construction shown in Figures 1 to 4 the laminated element consists of a number of plates 10 which are superposed and in contact with each other, and all of which are of conical form. The element so formed is preferably of a thickness which will provide sufficient thread to take the stresses which can be applied to it by the screwed stem which is to pass through it. The element may for instance have a thickness approximating to the thickness of an ordinary nut used for the particular diameter of threaded stem for which the element is designed.

Preferably, the element is housed within a body 11 forming a pressure ring, and at one end this body is provided with a deep recess 13 terminating in an inwardly-extending shoulder 12 at one end of the body.

The laminated element is placed in this recess 13 with its lower edge engaging the angle between the wall 14 of the recess and the inner shoulder 12 formed at the end of the body.

The wall of the recess may be serrated longitudinally, as shown at 14, or in any desired manner, and after the element has been placed in position in the body preliminary endwise pressure is applied to the element, forcing its periphery into binding contact with the wall of the recess. This preliminary pressure effects a partial flattening of the plates forming the laminated element. When the element has thus been secured in the body the element is drilled and tapped centrally to the required thread 15.

If the nut thus constructed is screwed onto a threaded stem and up against the work, the stress produced by the thread of the stem on the thread of the element brings about a further partial flattening of the plates forming the element, so that they contract at their inner edges and firmly bind on the thread of the stem.

The exterior 16 of the body, or if a body is not used of the element, may be square, hexagonal or any other required shape, and the binding pressure between the thread of the laminated element and the thread of the stem varies in accordance with the screw-up force applied to the nut.

After having been screwed-up tightly the nut can be unscrewed from the stem by applying to it the same force that was used in screwing it up, and the nut will then be a tight frictional fit for the particular threaded stem onto which it has been screwed.

The plates 10 forming the laminated element are preferably arranged in contact with each other, and each of these plates may be of a thickness equal to the pitch of the thread of the threaded stem with which the nut is to be used. Further, the plates may be made of any suitable material, for instance either steel or non-ferrous metal or elements may be used in which the plates are of different metals or materials.

The diameter of the hole 17 at the end of the body is preferably somewhat greater than the maximum diameter of the thread on the screwed stem.

The plates forming the laminated element may be of conical shape, with an initial base angle of, says, about 30°, and this angle may be reduced by 5° or 10° by the preliminary pressure used for securing the laminated element in the body. After the nut has been in use the base angle of the cone is still further reduced.

Elements may be made in which the plates are of different base angles varying, say, from an angle of 29° at one end to an angle of 25° at the other end.

The concave sides of the conical plates forming the laminated element are directed towards that end of the nut body where the inwardly-directed shoulder is provided.

Figure 5:
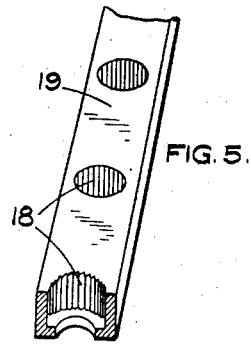
Figure 5 is a perspective view showing a modification.
Figure 3:
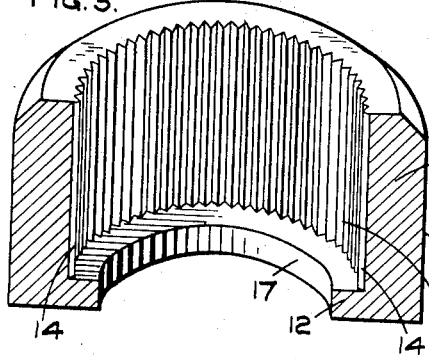
Figure 3 is a sectional perspective view showing the body.

Instead of mounting the laminated element in a hexagonal or other body, a number of laminated elements may be mounted in spaced recesses 18 in an elongated flat bar 19 so as to form a strip nut, as shown in Figure 5.

In Figure 6 the invention is shown applied to a floating anchor nut, and in this case the nut body is provided with an external flange 20 at its lower end, and this flange is housed between plates 21 and 22 which are secured together. The plate 22 is formed with a raised pocket which houses the flange 20, and in the end of the pocket is an opening 23 which is of larger diameter or larger dimensions than the transverse dimensions of the body of the nut. Similarly, the pocket 22 is larger than the flange 20, so that the nut is free to move at right angles to its axis. The plate 21 is provided with an opening 24 to permit the threaded stem to engage the nut and to provide for the floating movement.

Figure 7:
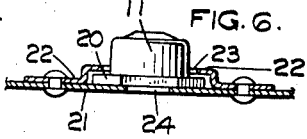
Figure 7 is a view in cross section showing another construction.
Figure 4:
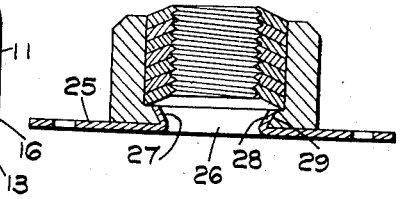
Figure 4 is a sectional view in side elevation showing the construction before drilling and tapping.

An anchor nut is shown in Figure 7 in which a plate 25 is attached to the end of the body of the nut, the plate being provided with a hole 26 around which is a tubular extension 27 which extends into the hole 29 in the end of the nut body and expanded at 28 to engage the tapered wall of the hole 29 in the end of the nut body. Such a plate may be of any suitable shape, and it may be provided with holes so that it can be secured in position on the work. The hole in the end of the nut body may be shouldered instead of tapered and of larger diameter than that of the neck of the tubular extension so that the nut is provided with a lateral floating movement.

Figure 8:
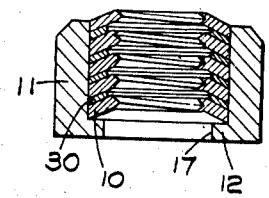
Figure 8 is a sectional view in side elevation showing a further construction.
Figure 2:
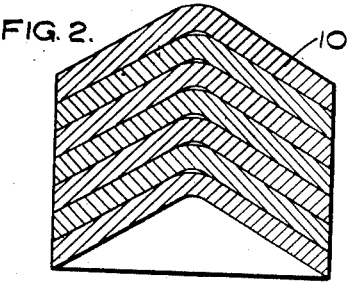
Figure 2 is a sectional view in side elevation of the laminated element.

In the construction shown in Figure 8 two conical plates 30 are placed between the plates 10. The plates 30 may be of hardened and tempered metal so as to increase the resilience of the laminated element as a whole. The holes at the centre of the plates 30 are of larger diameter than the screwthread provided in the plates 10.

Figure 9:
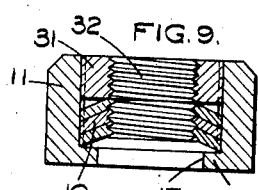
Figure 9 is a sectional view in side elevation showing a further construction.

In the construction shown in Figure 9 the pressure ring 11 contains a laminated element consisting of an assembly of the plates or bodies 10, and a sleeve 31 of similar outside form to that of the laminated element, this sleeve being threaded internally, as shown at 32, and this thread forming a continuation of the thread in the laminated element. In this construction the threaded sleeve may have a serrated exterior engaging the serrations within the pressure ring so that it cannot turn therein. It is however permitted to make the necessary axial movement so that endwise pressure will be exerted on the laminated element when the screw engages the thread. The laminated element is disposed between the threaded sleeve and that end of the pressure ring which is to engage the body.

Further, some of the plates forming the laminated element may be made of a different metal or material from others. For certain sealing purposes certain of the plates may be made of lead or other material for making steam- or gas-tight seal with the screwthread.

In any construction a flanged, split or other attachment member may be mounted on or in the end of the pressure ring or body.

The invention is applicable to anchor, floating anchor, strip, or floating strip nuts, and any form of screwthread may be used.

The exterior shape of the pressure ring or body and/or of the conical or dished plates may be of any form. For instance, it may be of square, hexagonal form similar to the shapes generally used for nuts, or it may be of cylindrical form having one or more tommy holes for lever operation, or the exterior may be of fluted cylindrical form suitable for insertion in full or part in prepared recesses in any part of a machine or other body.

One or all of the conical or dished plates may be split in one or more positions to facilitate closing.

The plates forming the laminated element may be locked together by indenting or punching at one or more suitable positions.

When a screwthread of V section is used the thread in the conical or dished plate, or in the laminated element, first engages the underside of the thread on the screw. The plate or element then starts to flatten until it engages the top side of the thread on the screw. The V section of the thread in the plate or element then commences to move inwardly towards the axis and to wedge into the tapered groove of the thread of the screw.

While I have shown and described particular forms of my invention, changes may be effected therein without departing from the spirit and scope thereof as set forth in the appended claims.

What I claim then is:

1. A nut comprising a body, a plurality of rings having conical faces superimposed upon one another with their adjacent faces in contact to form a laminated element provided with a bore therethrough, said body having a recess for receiving said element with the peripheries of said rings interlocked against relative rotation with respect to the wall of said recess and constituting the sole means connecting said rings, the bore of said element having a continuous helical thread of a cross-sectional shape and size substantially equal to the thread groove of a standard bolt whereby said element is adapted to move toward a flattened position when engaged by said bolt under load so as to contract said element to lock said nut on said bolt, the thickness of each ring being substantially equal to the pitch of said thread groove, and means at the lower end of said body engaging the outer peripheral portion only of the concave face of the lowermost ring.

2. A nut comprising a body, a plurality of rings having conical faces superimposed upon one another with their adjacent faces in contact to form a laminated element provided with a bore therethrough, said body having a recess for receiving said element with the peripheries of said rings interlocked against relative rotation with respect to the wall of said recess and constituting the sole means connecting said rings, the bore of said element having a continuous helical thread of a cross-sectional shape and size substantially equal to the thread groove of a standard bolt whereby said element is adapted to move toward a flattened position when engaged by said bolt under load so as to contract said element to lock said nut on said bolt, the thickness of each ring being substantially equal to the pitch of said thread groove, and means at the lower end of said body engaging the outer peripheral portion only of the concave face of the lowermost ring of said element, the angle between said concave face and said means at the lower end of said body being substantially 20°.

3. A nut comprising a body, a plurality of rings having conical faces superimposed upon one another with their adjacent faces in contact to form a laminated element provided with a bore therethrough, said body having a recess for receiving said element with the outer peripheral surface of said element interlocked against relative rotation with respect to the wall surface of said recess and constituting the sole means connecting said rings, one of said surfaces having serrations for maintaining said interlocked relationship, the bore of said element having a continuous helical thread of a cross-sectional shape and size substantially equal to the thread groove of a standard bolt whereby said element is adapted to move toward a flattened position when engaged by said bolt under load so as to contact said element to lock said nut on said bolt, the thickness of each ring being substantially equal to the pitch of said thread groove, and means at the lower end of said body engaging the outer peripheral portion only of the concave face of the lowermost ring.

4. A nut comprising a body, a plurality of rings having conical faces superimposed upon one another with their adjacent faces in contact to form a laminated element provided with a bore therethrough, said body having a recess for receiving said element with the peripheries of said rings interlocked against relative rotation with respect to the wall of said recess and constituting the sole means connecting said rings, the bore of said element having a continuous helical thread of a cross-sectional shape and size substantially equal to the thread groove of a standard bolt whereby said element is adapted to move toward a flattened position when engaged by said bolt under load so as to contract said element to lock said nut on said bolt, the thickness of each ring being substantially equal to the pitch of said thread groove, means at the lower end of said body engaging the outer peripheral portion only of the concave face of the lowermost ring, and a sleeve in said body recess above said laminated element, said sleeve being interlocked against relative rotation with respect to the wall of said recess and being threaded internally to form a continuation pf the thread of said element.

HARCOURT LESTER FORGAARD.

REFERENCES CITED

The following references are of record in the file of this patent:

UNITED STATES PATENTS

| Number | Name | Date |
|---|---|---|
| 1,161,317 | Keilland | Nov. 23, 1915 |
| 1,179,861 | Oehrle | Apr. 18, 1916 |
| 1,688,087 | Mirzan | Oct. 16, 1928 |
| 2,320,032 | Danforth | May 25, 1943 |
| 2,333,388 | Poupitch | Nov. 2, 1943 |
| 2,379,804 | Johnson | July 3, 1945 |
| 2,389,377 | Manning | Nov. 20, 1945 |
| 2,410,730 | Gwyn | Nov. 5, 1946 |

FOREIGN PATENTS

| Number | Country | Date |
|---|---|---|
| 425,881 | Germany | Feb. 27, 1926 |
| 512,740 | Great Britain | Sept. 25, 1939 |
| 877,871 | France | Sept. 14, 1942 |